US012692371B2

(12) United States Patent
Chen et al.

(10) Patent No.: US 12,692,371 B2
(45) Date of Patent: Jul. 28, 2026

(54) HYDROGEL COMPOSITION

(71) Applicant: TRONJEN MEDICAL TECHNOLOGY INC., Taichung City (TW)

(72) Inventors: Szu-Hsien Chen, Taichung City (TW); Chiu-Fang Chen, Taichung City (TW); Ya-Wen Ku, Taichung City (TW); Ren-Shian Wang, Taichung City (TW)

(73) Assignee: TRONJEN MEDICAL TECHNOLOGY INC., Taichung City (TW)

( * ) Notice: Subject to any disclaimer, the term of this patent is extended or adjusted under 35 U.S.C. 154(b) by 673 days.

(21) Appl. No.: 18/301,376

(22) Filed: Apr. 17, 2023

(65) Prior Publication Data

US 2024/0141144 A1 May 2, 2024

(30) Foreign Application Priority Data

Oct. 28, 2022 (TW) .................................. 111141222

(51) Int. Cl.
C08L 1/10 (2006.01)
C08K 3/16 (2006.01)
(Continued)

(52) U.S. Cl.
CPC ..................................... C08L 1/10 (2013.01); C08K 3/16 (2013.01); C08K 5/053 (2013.01); C08K 5/19 (2013.01); C08K 2201/014 (2013.01)

(58) Field of Classification Search
CPC . C08L 1/10; C08L 1/286; C08L 89/06; C08K 3/16; C08K 5/053; C08K 5/19; C08K 2201/014; C08B 15/005; C08H 1/06
See application file for complete search history.

(56) References Cited

U.S. PATENT DOCUMENTS 6,706,279 B1 * 3/2004 Hazzi .................... A61L 26/008
424/443
2004/0241214 A1 * 12/2004 Kirkwood ............... A61L 15/42
424/445
2024/0398958 A1 * 12/2024 Huang .................... A61L 27/26

FOREIGN PATENT DOCUMENTS

CN 105056279 A 11/2015
TW 202229419 A 8/2022

OTHER PUBLICATIONS

Reyes et al. (MJBAS, vol. 4, Issue 2, pp. 93-104, Apr.-Jun. 2020) (Year: 2020).*

(Continued)

*Primary Examiner* — Catherine S Branch
*Assistant Examiner* — Olga Lucia Donahue
(74) *Attorney, Agent, or Firm* — HSML P.C.

(57) ABSTRACT

Disclosed herein is a hydrogel composition that includes a crosslinked collagen polymer, a carboxymethyl cellulose derivative, an aqueous sodium chloride solution, a humectant, and an antimicrobial agent. The crosslinked collagen polymer has collagen, a hydrophilic polyether, and a dicarbamate group linking the collagen to the hydrophilic polyether. The carboxymethyl cellulose derivative is selected from the group consisting of carboxymethyl cellulose, an alkali metal salt of carboxymethyl cellulose, an ammonium salt of carboxymethyl cellulose, and combinations thereof. The humectant is selected from the group consisting of glycerin, propylene glycol, and a combination thereof. The antimicrobial agent is a combination of glycine betaine and polyhexamethylene biguanide hydrochloride.

9 Claims, 2 Drawing Sheets
(2 of 2 Drawing Sheet(s) Filed in Color)

Example

Comparative Example 1

Comparative Example 2

(51) Int. Cl.
    *C08K 5/053*         (2006.01)
    *C08K 5/19*          (2006.01)

(56)                References Cited

OTHER PUBLICATIONS

Search Report appended to an Office Action, which was issued to Taiwanese counterpart application No. 111141222 by the TIPO on Apr. 28, 2023, with an English translation thereof (2 pages).

\* cited by examiner

Example

Comparative
Example 1

Comparative
Example 2

Experimental group

Comparative group 1

Comparative group 2

HYDROGEL COMPOSITION

CROSS-REFERENCE TO RELATED APPLICATION

This application claims priority of Taiwanese Invention Patent Application No. 111141222, filed on Oct. 28, 2022.

FIELD

The present disclosure relates to a hydrogel composition including a crosslinked collagen polymer, a carboxymethyl cellulose derivative, an aqueous sodium chloride solution, a humectant, and an antimicrobial agent.

BACKGROUND

At present, hydrogels used to promote wound healing usually contain hydrophilic polymers and humectants. When the hydrogel is applied to a skin wound, it can absorb wound exudate and provide an environment needed for wound healing.

However, the hydrogel still needs to be improved in terms of wound adhesion, wound exudate absorption, anti-inflammatory effect, and antimicrobial activity. In particular, the wound bed of diabetic patients suffers from imbalance and hyperactivation of immune cells such as neutrophils, mast cells, and macrophages. Therefore, when the immune cells gather in the wound bed, it would cause a severe and prolonged inflammatory response, thus increasing the difficulty of wound healing. Furthermore, prolonged exposure of the wound to the air for a long time would promote bacterial growth, and the patient would suffer from repeated debridement and wound dressing changes.

In spite of the aforesaid, there is still a need for those skilled in the art to develop a hydrogel composition, which has excellent anti-inflammatory effect and antimicrobial activity, and can effectively promote wound healing.

SUMMARY

Therefore, an object of the present disclosure is to provide a hydrogel composition, which can alleviate at least one of the drawbacks of the prior art, and which includes a crosslinked collagen polymer, a carboxymethyl cellulose derivative, an aqueous sodium chloride solution, a humectant, and an antimicrobial agent.

The crosslinked collagen polymer has collagen, a hydrophilic polyether, and a dicarbamate group linking the collagen to the hydrophilic polyether. The carboxymethyl cellulose derivative is selected from the group consisting of carboxymethyl cellulose, an alkali metal salt of carboxymethyl cellulose, an ammonium salt of carboxymethyl cellulose, and combinations thereof. The humectant is selected from the group consisting of glycerin, propylene glycol, and a combination thereof. The antimicrobial agent is a combination of glycine betaine and polyhexamethylene biguanide hydrochloride.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the disclosure will become apparent in the following detailed description of the embodiment(s) with reference to the accompanying drawings. It is noted that various features may not be drawn to scale.

DETAILED DESCRIPTION

Figure 1:
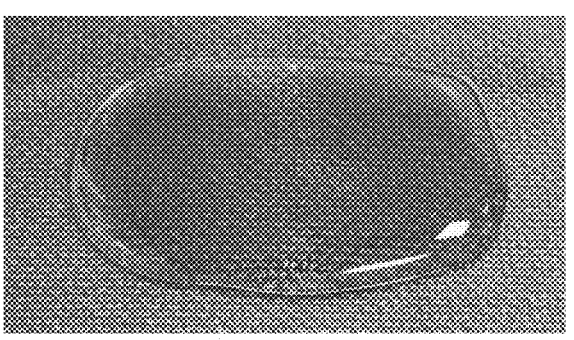
FIG. 1 shows the simulated body fluid test result of each test sample, infra.
Figure 1:
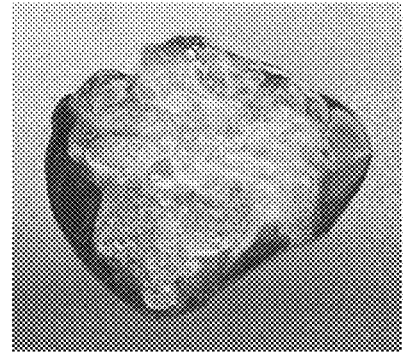
Figure 1:
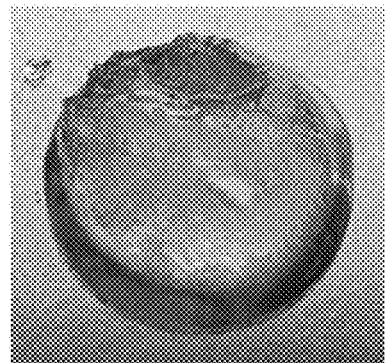

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a hydrogel composition, which includes a crosslinked collagen polymer, a carboxymethyl cellulose (CMC) derivative, an aqueous sodium chloride solution, a humectant, and an antimicrobial agent.

The crosslinked collagen polymer has collagen, a hydrophilic polyether, and a dicarbamate group linking the collagen to the hydrophilic polyether. The carboxymethyl cellulose derivative is selected from the group consisting of carboxymethyl cellulose, an alkali metal salt of carboxymethyl cellulose, an ammonium salt of carboxymethyl cellulose, and combinations thereof. The humectant is selected from the group consisting of glycerin, propylene glycol, and a combination thereof. The antimicrobial agent is a combination of glycine betaine and polyhexamethylene biguanide (PHMB) hydrochloride.

In certain embodiments, the hydrophilic polyether is polyethylene glycol.

In certain embodiments, the dicarbamate group is formed by the steps of:

(a) reacting the hydrophilic polyether with a diisocyanate to obtain a hydrophilic diisocyanate, the diisocyanate being selected from the group consisting of hexamethylene diisocyanate (HDI), dicyclohexylmethane-4,4'-diisocyanate ($H_{12}MDI$), isophorone diisocyanate (IPDI), and combinations thereof; and (b) reacting the collagen with the hydrophilic diisocyanate.

In certain embodiments, the collagen is type I collagen.

In certain embodiments, in the crosslinked collagen polymer, a molar ratio of the collagen to the hydrophilic polyether ranges from 2:1 to 10:1.

In certain embodiments, the crosslinked collagen polymer may be present in an amount ranging from 0.5 wt % to 5 wt %, based on the total weight of the hydrogel composition. In an exemplary embodiment, the crosslinked collagen polymer is present in an amount ranging from 2 wt % to 4 wt %, based on the total weight of the hydrogel composition.

In certain embodiments, the humectant may be present in an amount ranging from 1 wt % to 47.5 wt %, based on the total weight of the hydrogel composition.

In certain embodiments, the carboxymethyl cellulose derivative may be present in an amount ranging from 1 wt % to 10 wt %, based on the total weight of the hydrogel composition.

In certain embodiments, the aqueous sodium chloride solution has a concentration ranging from 0.5 wt % to 1.0 wt %.

According to the present disclosure, the hydrogel composition can effectively absorb wound exudate and adhere to the wound, and can exhibit excellent anti-inflammatory and anti-microbial activities, thereby promoting wound healing.

The disclosure will be further described by way of the following examples. However, it should be understood that the following examples are solely intended for the purpose of illustration and should not be construed as limiting the disclosure in practice.

EXAMPLES

Example (EX)

An exemplary hydrogel composition of the present disclosure was prepared as follows.

In step (a), polyethylene glycol (PEG 1000 diol) and hexamethylene diisocyanate (HDI) were mixed in a molar ratio of 1:2, and 0.05 wt % triethylenediamine (TEDA) (based on the total weight of PEG 1000 diol and HDI) was then used as a catalyst. The resultant mixture was stirred at 80° C. for 90 minutes to be reacted under an enclosed nitrogen atmosphere. During the reaction above, fourier transform-infrared (FT-IR) spectroscopy analysis was used to monitor the presence of the characteristic NCO group (—NCO) peak at 2270 cm$^{-1}$. Detection of the characteristic NCO group peak at 2270 cm$^{-1}$ indicates that a hydrophilic diisocyanate was obtained.

In step (b), type I collagen (i.e., marine collagen purchased from First Cosmetics Works Co., Ltd.) and the hydrophilic diisocyanate were mixed in a molar ratio of 2:1, and 0.05 wt % TEDA (based on the total weight of the type I collagen and the hydrophilic diisocyanate) was then used as a catalyst. The resultant mixture was stirred at 50° C. for 24 hours to be reacted under an enclosed nitrogen atmosphere. During the cross-linking reaction above, FT-IR spectroscopy analysis was used to monitor the presence of the characteristic NCO group (—NCO) peak at 2270 cm$^{-1}$. Detection of the characteristic NCO group peak at 2270 cm$^{-1}$ indicates that a crosslinked collagen polymer was obtained.

In step (c), glycerin, carboxymethyl cellulose, and the crosslinked collagen polymer were mixed in sequence, and then mixed with a 0.9 wt % aqueous sodium chloride solution containing polyhexamethylene biguanide (PHMB) (View Star Co., Ltd.) hydrochloride at 40° C. to 45° C. for 2 hours. Next, the resultant mixture was evenly mixed with glycerin betaine (Emperor Chemical Co., Ltd.), so as to obtain the hydrogel composition. In the hydrogel composition, the weight ratio of glycerin, carboxymethyl cellulose, the crosslinked collagen polymer, PHMB, the 0.9 wt % aqueous sodium chloride solution, and glycine betaine was 40:4:3:0.1:52.88:0.02. The hydrogel composition was used as a test sample, and was subjected to the following analyses.

Comparative Example 1 (CE1)

Glycerin, carboxymethyl cellulose, type I collagen (i.e., marine collagen purchased from First Cosmetics Works Co., Ltd.), PHMB, a 0.9 wt % aqueous sodium chloride solution, and glycine betaine were mixed in a weight ratio of 40:4:3:0.1:52.88:0.02, followed by stirring at 40° C. to 45° C. for 2 hours, so as to obtain a hydrogel composition of CE1. The hydrogel composition was used as a test sample, and was subjected to the following analyses.

Comparative Example 2 (CE2)

Intrasite gel (which was a sterile, amorphous hydrogel wound dressing) purchased from Smith & Nephew Co., Ltd. was used as a test sample of CE2.

Simulated Body Fluid (SBF) Test:

3 g of a respective one of the test samples of EX and CE1 to CE2 was placed in a Petri dish, followed by adding 1.5 mL of SBF (which was stained with a red food dye) to each test sample. The components and the amounts thereof for making the SBF are summarized in Table 1 below.

TABLE 1

| Component | Amount |
|---|---|
| NaCl | 7.996 g |
| NaHCO$_3$ | 0.350 g |
| KCl | 0.224 g |
| K$_2$HPO$_4$•3H$_2$O | 0.228 g |
| MgCl$_2$•6H$_2$O | 0.305 g |
| 1M HCl$_{(aq)}$ | 40 mL |
| CaCl$_2$ | 0.278 g |
| Na$_2$SO$_4$ | 0.071 g |
| (CH$_2$OH)$_3$CNH$_2$ | 6.057 g |

At the 2$^{nd}$ hour after start of application of the SBF, the appearance of each test sample was visually observed.

Referring to FIG. 1, at the 2$^{nd}$ hour after start of application of the SBF, the SBF was evenly distributed in the test sample of EX, and the test sample of EX exhibited excellent fluidity, indicating that the hydrogel composition of the present disclosure can effectively absorb wound exudate and attach to the wound.

On the contrary, at the 2$^{nd}$ hour after start of application of the SBF, the SBF could not be evenly distributed in the test samples of CE1 and CE2, and the respective one of the test samples of CE1 and CE2 was in the form of a solid gel.

Animal Model Test:

A. Experimental Rats

Male Wistar rats (6-8 weeks old, with a body weight of greater than 300 g) used in the following experiments were purchased from BioLASCO Taiwan Co., Ltd. All the experimental rats were housed in an animal room under the following laboratory conditions: a temperature maintained at 22*3° C., and a relative humidity maintained at 30% to 70%. Furthermore, water and feed were provided ad libitum for all the experimental rats.

B. Sterilization of Hydrogel Composition

The respective one of the test samples of EX and CE1 was subjected to sterilization by gamma irradiation (irradiation dose: 35 kGy), and was used for the following experiment.

C. Wound Formation and Application of Hydrogel Composition

The Wistar rats were subjected to induction of diabetes by streptozotocin (STZ) using techniques well-known to those skilled in the art, and then the rats having a blood glucose level greater than 300 mg/dL, which were deemed as diabetic rats, were selected.

Next, the diabetic rats were divided into 3 groups, including one experimental group and two comparative groups (i.e., comparative groups 1 and 2) (n=5 per group). The dorsal part of each diabetic rat was shaved and then disinfected with 75% alcohol. Thereafter, the diabetic rats were anesthetized with isoflurane, followed by cutting, on the back of the respective diabetic rat using sterile surgical scissors and a blade, so as to form a skin wound having an area of about 2 cm×2 cm.

The skin wounds of the experimental group, the comparative group 1 and the comparative group 2 were respectively applied with the sterilized test sample of EX, test sample of CE1, and test sample of CE2 (the amount of each test sample was 3 g), and then covered with 3M™ Tegaderm™ transparent film dressing (Cat. No. 1622W), followed by fixing the test sample and the transparent film dressing with breathable elastic bandages.

Before application of the test sample (i.e., on Day 0), and on Day 7, Day 14, and Day 21 after application of the test sample, a portion of the skin wound of each rat was photographed using a digital camera, and the respective wound area was calculated by ImageJ software. Thereafter, the respective skin wound was applied with the corresponding test sample as described above, and replaced with new 3M™ Tegaderm™ transparent film dressing and breathable elastic bandages.

The residual wound area rate (%) was calculated using the following Equation (I):

$$A = (B/C) \times 100 \qquad \text{(I)}$$

where A=residual wound area rate (%)
  B=wound area determined on Day 7, Day 14, or Day 21 after application of the test sample
  C=wound area determined on Day 0

The results are shown in Table 2 below. As shown in Table 2, on Day 7 after application of the test sample, the residual wound area rate determined in the experimental group was significantly lower than those determined in the comparative groups 1 and 2, and similar satisfactory results were observed with respect to Day 14 and Day 21. These results indicate that the hydrogel composition of the present disclosure can effectively promote wound healing.

TABLE 2

| Test sample | | Experimental group EX | Comparative group 1 CE1 | Comparative group 2 CE2 |
|---|---|---|---|---|
| Residual | Day 7 | 52.23 ± 9.03 | 60.19 ± 8.16 | 63.57 ± 10.34 |
| wound area | Day 14 | 11.12 ± 2.85 | 22.30 ± 7.52 | 29.74 ± 9.45 |
| rate (%) | Day 21 | 7.58 ± 0.71 | 10.76 ± 1.13 | 13.69 ± 3.08 |

D. Histopathologic Analysis

After completion of the determination of residual wound area rate on Day 7 as described in abovementioned section C, the skin tissue (including new skin tissue inside the wound edge and original skin tissue outside the wound edge) was obtained from another portion of the skin wound of each rat, followed by fixation with a 10% formalin at room temperature overnight. The fixed tissue sample was then embedded with paraffin, followed by slicing to obtain a tissue section having a thickness of 50 μm. The tissue section was stained with hematoxylin and eosin (H&E) using a staining protocol well-known to those skilled in the art, and was observed under a Motic EasyScan Pro 6 digital slide scanner at a magnification of 10×.

Figure 2:
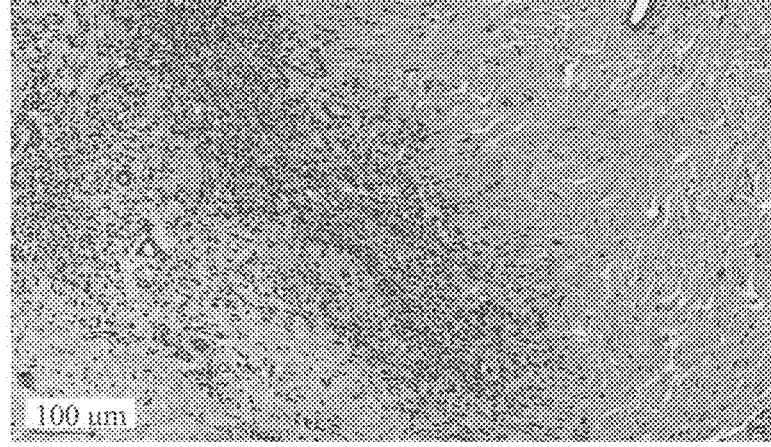
FIG. 2 shows the histological observation result of each group, infra.
Figure 2:
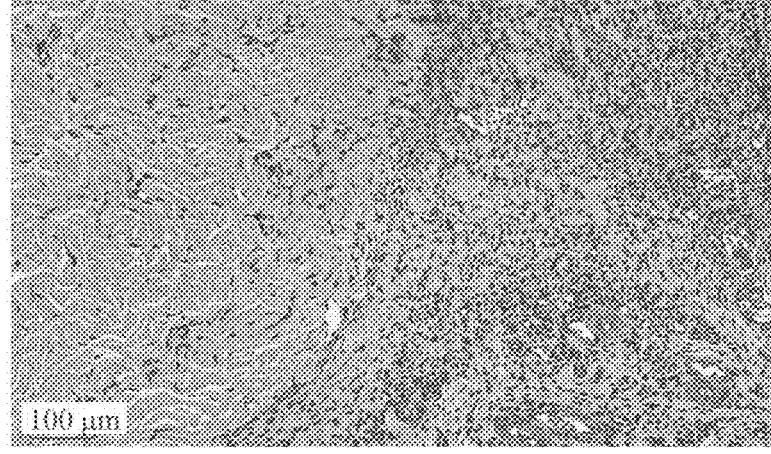

Referring to FIG. 2, on Day 7 after application of the test sample, the inflammatory cells (i.e., cells that were stained bluish-purple) determined in the experimental group were significantly lower than those determined in the comparative groups 1 and 2, indicating that the hydrogel composition of the present disclosure can effectively reduce inflammatory infiltration and has excellent anti-inflammatory effect.

E. Collagen Density Analysis

The tissue section obtained in abovementioned section D was subjected to Masson's trichrome staining using a staining protocol well-known to those skilled in the art, and then was observed under a Motic EasyScan Pro 6 digital slide scanner at a magnification of 10×.

The collagen density was measured by ImageJ software, and the recovery rate (%) of collagen density was calculated using the following Equation (II):

$$D = (E/F) \times 100 \qquad \text{(II)}$$

where D=recovery rate (%) of collagen density
  E=collagen density determined in the new skin tissue
  F=collagen density determined in the original skin tissue The results are shown in Table 3 below. As shown in Table 3, on Day 7 after application of the test sample, the recovery rate of collagen density determined in the experimental group was significantly higher than those determined in the comparative groups 1 and 2, indicating that the hydrogel composition of the present disclosure is capable of improving collagen synthesis, and hence can effectively promote wound healing.

TABLE 3

| Test sample | Experimental group EX | Comparative group 1 CE1 | Comparative group 2 CE2 |
|---|---|---|---|
| Recovery rate (%) of collagen density | 35.84 ± 5.32 | 26.30 ± 6.21 | 8.94 ± 1.69 |

Evaluation of Antimicrobial Effect of Hydrogel Composition:

10 g of the test sample of EX was subjected to time-kill analysis in accordance with ASTM E2315-03 entitled "Standard Guide for Assessment of Antimicrobial Activity Using a Time-Kill Procedure", so as to determine the reduction rate of five test microorganisms (i.e., *Escherichia coli* ATCC 8739, *Staphylococcus aureus* ATCC 6538, *Pseudomonas aeruginosa* ATCC 9027, *Candida albicans* ATCC 10231, and *Aspergillus brasiliensis* ATCC 16404) within 48 hours after contact with the test sample of EX.

The results are shown in Table 4 below. As shown in Table 4, the reduction rate of a respective one of the five microorganisms was greater than 99%, indicating that the hydrogel composition of the present disclosure is capable of effectively reducing a microbial population, and hence can exhibit excellent antimicrobial effect.

TABLE 4

| Microorganism | Reduction rate (%) |
|---|---|
| *Escherichia coli* ATCC 8739 | >99.99 |
| *Staphylococcus aureus* ATCC 6538 | 99.97 |
| *Pseudomonas aeruginosa* ATCC 9027 | >99.99 |

TABLE 4-continued

| Microorganism | Reduction rate (%) |
|---|---|
| *Candida albicans* ATCC 10231 | 99.14 |
| *Aspergillus brasiliensis* ATCC 16404 | >99.99 |

Summarizing the above test results, it is clear that by virtue of the crosslinked collagen polymer, the carboxymethyl cellulose derivative, the humectant, the glycine betaine, and the polyhexamethylene biguanide hydrochloride, the hydrogel composition of the present disclosure is capable of effectively absorbing wound exudate and attaching to the wound, and has excellent anti-inflammatory effect and antimicrobial effect, and hence can promote wound healing.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hydrogel composition comprising:
   a crosslinked collagen polymer that comprises a collagen, a hydrophilic polyether, and a dicarbamate group linking the collagen to the hydrophilic polyether, wherein a molar ratio of the collagen to the hydrophilic polyether ranges from 2:1 to 10:1;
   a carboxymethyl cellulose derivative selected from the group consisting of carboxymethyl cellulose, an alkali metal salt of carboxymethyl cellulose, an ammonium salt of carboxymethyl cellulose, and a combination thereof;
   an aqueous sodium chloride solution;
   a humectant selected from the group consisting of glycerin, propylene glycol, and a combination thereof; and
   an antimicrobial agent comprising a combination of glycine betaine and polyhexamethylene biguanide hydrochloride.

2. The hydrogel composition as claimed in claim 1, wherein the hydrophilic polyether is polyethylene glycol.

3. The hydrogel composition as claimed in claim 1, wherein the dicarbamate group is formed by:
   (a) reacting the hydrophilic polyether with a diisocyanate to obtain a hydrophilic diisocyanate, the diisocyanate being selected from the group consisting of hexamethylene diisocyanate, dicyclohexylmethane-4,4'-diisocyanate ($H_{12}$MDI), isophorone diisocyanate (IPDI), and combinations thereof; and
   (b) reacting the collagen with the hydrophilic diisocyanate.

4. The hydrogel composition as claimed in claim 1, wherein the collagen is type I collagen.

5. The hydrogel composition as claimed in claim 1, wherein the crosslinked collagen polymer is present in an amount ranging from 0.5 wt % to 5 wt %, based on the total weight of the hydrogel composition.

6. The hydrogel composition as claimed in claim 5, wherein the crosslinked collagen polymer is present in an amount ranging from 2 wt % to 4 wt %, based on the total weight of the hydrogel composition.

7. The hydrogel composition as claimed in claim 1, wherein the humectant is present in an amount ranging from 1 wt % to 47.5 wt %, based on the total weight of the hydrogel composition.

8. The hydrogel composition as claimed in claim 1, wherein the carboxymethyl cellulose derivative is present in an amount ranging from 1 wt % to 10 wt %, based on the total weight of the hydrogel composition.

9. The hydrogel composition as claimed in claim 1, wherein the aqueous sodium chloride solution has a concentration ranging from 0.5 wt % to 1.0 wt %.

* * * * *